(12) United States Patent
Yoon et al.

(10) Patent No.: US 8,670,614 B2
(45) Date of Patent: Mar. 11, 2014

(54) METHOD AND SYSTEM FOR PROVIDING TILE MAP SERVICE USING IMAGE FUSION

(75) Inventors: Chang Rak Yoon, Daejeon (KR); Hak Cheol Kim, Daejeon (KR); Ki Jung Lee, Gyeonggi-do (KR); Kyung Ok Kim, Daejeon (KR); Seong Ho Lee, Daejeon (KR); Jae Chul Kim, Daejeon (KR); Yoon Seop Chang, Daejeon (KR); Sung Woong Shin, Daejeon (KR)

(73) Assignee: Electronics & Telecommunications Research Institute, Daejeon (KR)

( * ) Notice: Subject to any disclaimer, the term of this patent is extended or adjusted under 35 U.S.C. 154(b) by 125 days.

(21) Appl. No.: 13/310,697

(22) Filed: Dec. 2, 2011

(65) Prior Publication Data

US 2012/0141026 A1 Jun. 7, 2012

(30) Foreign Application Priority Data

Dec. 3, 2010 (KR) ........................ 10-2010-0122925

(51) Int. Cl.
*G06K 9/00* (2006.01)
(52) U.S. Cl.
USPC ....................................................... 382/167
(58) Field of Classification Search
USPC ................. 382/100, 103, 104, 113, 305, 325;
340/995.1–995.15; 342/457;
455/404.2, 414.2, 456.1, 457; 701/431,
701/452, 455, 532; 709/223
See application file for complete search history.

(56) References Cited

U.S. PATENT DOCUMENTS

| 7,158,878 | B2* | 1/2007 | Rasmussen et al. | ........... 701/431 |
| 7,379,811 | B2* | 5/2008 | Rasmussen et al. | ........... 701/532 |
| 7,894,984 | B2* | 2/2011 | Rasmussen et al. | ........... 701/452 |
| 8,041,334 | B2* | 10/2011 | Yoon | ........................ 455/404.2 |
| 8,346,277 | B2* | 1/2013 | Kim et al. | ................. 455/456.1 |
| 2005/0021560 | A1 | 1/2005 | Yoon et al. | |
| 2009/0285283 | A1 | 11/2009 | Gao et al. | |
| 2010/0201707 | A1 | 8/2010 | Rasmussen et al. | |
| 2012/0141026 | A1* | 6/2012 | Yoon et al. | ................. 382/167 |

FOREIGN PATENT DOCUMENTS

| JP | 2004-062182 A | 2/2004 |
| KR | 2004-0025106 A | 3/2004 |

* cited by examiner

*Primary Examiner* — Jose Couso
(74) *Attorney, Agent, or Firm* — Rabin & Berdo, P.C.

(57) ABSTRACT

A system includes a server including a map data storage device storing original tile map data, grayscale image tile map data, and a plurality of multi-resolution color image tile map data having a resolution lower than that of the grayscale image tile map data, and a multi-resolution tile map data generation and transmission device generating the grayscale image tile map data and the multi-resolution color image tile map data and storing the generated data in the map data storage device, and a client including a multi-resolution tile map data reception and fusion device generating color tile map data by fusing the received grayscale image tile map data and color image tile map data and providing the color tile map data to a user, in which the resolution of the color image tile map data transmitted from the server is variably controlled according to the network environment.

12 Claims, 3 Drawing Sheets

METHOD AND SYSTEM FOR PROVIDING TILE MAP SERVICE USING IMAGE FUSION

CROSS-REFERENCE TO RELATED PATENT APPLICATION

This application claims the benefit of Korean Patent Application No. 10-2010-0122925, filed on Dec. 3, 2010, in the Korean Intellectual Property Office, the disclosure of which is incorporated herein in its entirety by reference.

BACKGROUND OF THE INVENTION

1. Field of the Invention

The present invention relates to a method and system for providing a tile map service and, more particularly, to a method for providing a tile map service, which can effectively transmit, receive, and restore a tile map in a service for transmitting and receiving a large and high-resolution tile map, and a system for the same.

2. Description of the Related Art

A spatial information service technology is a technology that digitizes a variety of spatial phenomenon information and provides the digitized information to a user such that the user can effectively identify various spatial, physical and social phenomena.

A technique for providing digital map data in the spatial information service technology typically uses a tile map service. The tile map service means a service that divides original digital map data into a plurality of map tiles in the form of a grid and transmits only map tiles selected from the original digital map data and corresponding to a request from a receiving client such that the receiving client generates the original map data by combining the received map tiles. For example, the receiving client can receive a map service without transmitting large original digital map data in such a manner that only map tiles corresponding to the current location of the user or the point where that the user wishes to move are selected from the original entire map data and transmitted. A representative example of the tile map service includes Google map service provided by Internet portal sites such as Google, etc. Prior art related to the tile map service of Google includes U.S. Patent Publication No. 20100201707 entitled "Digital Mapping System" filed by the same company.

Moreover, Korean Patent Publication No. 10-2004-0025106 discloses a method of providing map data, in which map data consisting of vector data and image data is divided into a plurality of tile regions in the form of a checkerboard, the vector data and the image data are coded for each tile region and stored in a database, and only tile region data corresponding to a map requested by a client is transmitted to the client.

However, even when adopting the prior art methods, a significant delay may occur when a map tile including precise image data is transmitted, received, and restored, and it is impossible to provide an adaptive tile map service corresponding to a change in the network environment due to a lack of consideration for the variable network environment.

SUMMARY OF THE INVENTION

The present invention has been made in an effort to solve the above-described problems associated with prior art, and an object of the present invention is to provide a system for providing a tile map service using image fusion, which can provide a tile map service while controlling the amount of transmitted tile map data using image fusion based on the variable network environment, unlike conventional systems for providing tile map services.

An object of the present invention is to provide a method for providing a tile map service using image fusion, which can provide a tile map service while controlling the amount of transmitted tile map data using image fusion based on the variable network environment, unlike conventional methods for providing tile map services.

According to an aspect of the present invention to achieve the above object of the present invention, there is provided a system for providing a tile map service using image fusion, the system comprising a server and a client which receives a tile map service from the server through a network, wherein the server comprises a map data storage device, which stores original tile map data, grayscale image tile map data generated from the original tile map data, and a plurality of multi-resolution color image tile map data having a resolution lower than that of the grayscale image tile map data, and a multi-resolution tile map data generation and transmission device, which reads the original tile map data from the map data storage device, generates the grayscale image tile map data and the multi-resolution color image tile map data, and stores the generated data in the map data storage device, the server transmitting the grayscale image tile map data and color image tile map data having a resolution selected from the plurality of multi-resolution color image map data, wherein the client comprises a multi-resolution tile map data reception and fusion device which generates color tile map data having the resolution of the grayscale image tile map data by fusing the grayscale image tile map data and the color image tile map data, which are received through the network, and provides the color tile map data to a user, and wherein the resolution of the color image tile map data transmitted from the server is variably controlled by the client according to the network environment.

The plurality of multi-resolution color image map data may comprise a plurality of color image tile map data, and the resolution of each of the plurality of color image map data may be defined as a width of $W/M^N$ and a height of $H/M^N$ (where each of M and N is an integer of 1 or greater) when the grayscale image tile map data has a resolution with a width of W and a height of H.

The color image tile map data transmitted from the server may be selected from the plurality of multi-resolution color image map data having a resolution with a width of $W/M^N$ and a height of $H/M^N$ corresponding to the value of N based on the value of N (N is an integer of 1 or greater) included in map data request information and transmitted by the client.

According to another aspect of the present invention to achieve the above object of the present invention, there is provided a server for providing a tile map service through a network, the server comprising: a map data storage device which stores original tile map data, grayscale image tile map data generated from the original tile map data, and a plurality of multi-resolution color image tile map data; and a multi-resolution tile map data generation and transmission device, wherein the multi-resolution tile map data generation and transmission device comprises: a grayscale image map data generation unit which reads the original tile map data from the map data storage device, generates grayscale image tile map data, and stores the grayscale image tile map data in the map data storage device; a multi-resolution color image map data generation unit which reads the original tile map data from the map data storage device, generates a plurality of multi-resolution color image tile map data having a resolution lower than that of the grayscale image tile map data, and stores the generated data in the map data storage device; and a map data request reception/map data transmission unit which reads color image tile map data having a resolution, selected from the plurality of multi-resolution color image tile map data stored in the map data storage device, and the grayscale image tile map data in response to map data request information received from a client and transmits the read data to the client.

According to still another aspect of the present invention to achieve the above object of the present invention, there is provided a client for receiving a tile map service through a network, the client comprising: a map data request transmission/map data reception unit which transmits map data request information for requesting tile map data to a server through the network and receives grayscale image tile map data, which corresponds to the map data request information, and color image tile map data having a resolution lower than that of the grayscale image tile map data, the map data request information including a value used to designate the resolution of the color image tile map data; a map data restoration unit which receives the grayscale image tile map data and the color image tile map data from the map data request transmission/map data reception unit and generates color tile map data having the resolution of the grayscale image tile map data; a network environment log storage unit which logs a usage history of the network; and a network environment analysis unit which analyzes the network environment based on the network usage history logged in the network environment log storage unit to determine a value, which is used to designate the resolution of the color image tile map data and included in the map data request information, and transmits the determined value to the map data request transmission/map data reception unit.

According to yet another aspect of the present invention to achieve the above object of the present invention, there is provided a method for providing a tile map service through a network, the method comprising: generating grayscale image tile map data and a plurality of multi-resolution color image tile map data; initializing map data request information; identifying the map data request information; transmitting, at a server, original tile map data and receiving, at a client, the original tile map data and generating map data by combining the received original tile map data, when it is determined from the map data request information that image fusion is not used; selecting, at the server, color image tile map data having a resolution determined based on the map data request information from the grayscale image tile map data and the plurality of multi-resolution color image tile map data, and transmitting the selected data, and receiving, at the client, the transmitted data and generating map data by fusing the received grayscale image tile map data and color image tile map data and combining the fused tile map data, when it is determined from the map data request information that the image fusion is used; collecting and storing network environment information; analyzing the network environment based on the collected network environment information; and updating the map data request information based on the analyzed network environment, wherein after the updating of the map data request information, the identifying of the map data request information is repeated based on the updated map data request information.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

While the invention is susceptible to various modifications and alternative forms, specific embodiments thereof are shown by way of example in the drawings and will herein be described in detail. It should be understood, however, that there is no intent to limit the invention to the particular forms disclosed, but on the contrary, the invention is to cover all modifications, equivalents, and alternatives falling within the spirit and scope of the invention. Like numbers refer to like elements throughout the description of the figures.

It will be understood that, although the terms first, second, A, B etc. may be used herein to describe various elements, these elements should not be limited by these terms. These terms are only used to distinguish one element from another. For example, a first element could be termed a second element, and similarly, a second element could be termed a first element, without departing from the scope of the present invention. As used herein, the term "and/or" includes any and all combinations of one or more of the associated listed items.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises", "comprising", "includes" and/or "including", when used herein, specify the presence of stated features, integers, steps, operations, elements, and/or components, but do not preclude the presence or addition of one or more other features, integers, steps, operations, elements, components, and/or groups thereof.

Unless otherwise defined, all terms, including technical and scientific terms, used herein have the same meaning as commonly understood by one of ordinary skill in the art to which this invention pertains. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present invention will be described in detail with reference to the accompanying drawings.

Figure 1:
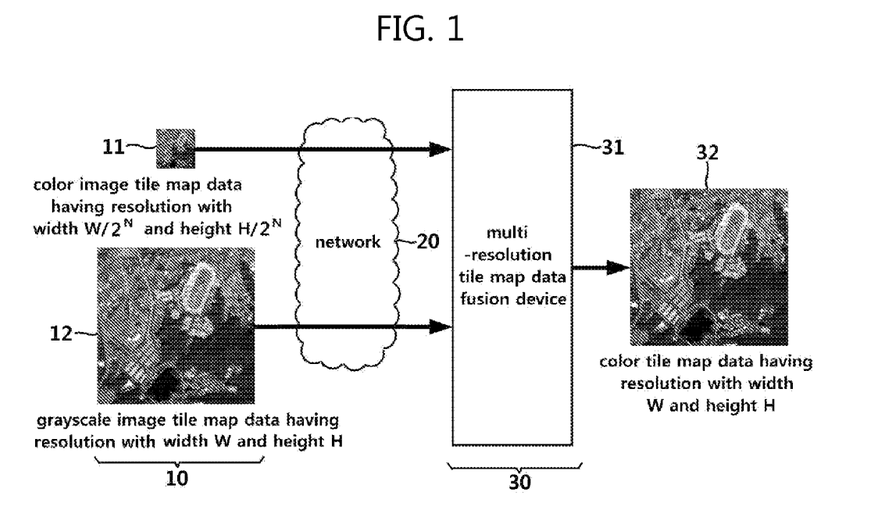
FIG. 1 is a diagram illustrating the concept of a tile map service using image fusion in accordance with the present invention.

FIG. 1 is a diagram illustrating the concept of a tile map service using image fusion in accordance with the present invention.

Referring to FIG. 1, according to a tile map service using image fusion in accordance with the present invention, a server 10 for providing a map service prepares grayscale image tile map data 12 having a resolution with a width of W and a height of H and color image tile map data 11 having a resolution with a width of $W/M^N$ and a height of $H/M^N$ (where each of M and N is an integer of 1 or greater).

Preferably, M may have a value of 2. Thus, the color image tile map data 11 may have a resolution lower than that of the grayscale image tile map data 12 (if N is equal to or greater than 1).

The color image tile map data 11 and the grayscale image tile map data 12 are transmitted to a client 30 through a network 20. The transmitted color image tile map data 11 and grayscale image tile map data 12 are fused by a multi-resolution tile map data fusion device 31 of the client 30 and restored to color tile map data 32 having a resolution with a width of W and a height of H.

Typically, the amount of color map data is several times to several tens of times greater than that of grayscale map data depending on the color depth, and thus it is possible to reduce the amount of transmitted data by controlling the value of N according to the variable environment of the transmission network 20.

Meanwhile, although it has been described that the color image tile map data has a resolution with a width of $W/2^N$ and a height of $H/2^N$ with respect to the grayscale image tile map data having a resolution with a width of W and a height of H in FIG. 1, the resolution of the color image tile map data may be set to a width of W/N and a height of H/N, a width of $W/3^N$ and a height of $H/3^N$, etc. That is, while the values of $W/2^N$ and $H/2^N$ can be selected to improve the efficiency of image restoration, the resolution of the color image tile map data may be controlled in another manner to provide more precise variable transmission control. That is, the color image tile map data 11 may typically have a resolution with a width of $W/M^N$ and a height of $H/M^N$ (where each of M and N is an integer of 1 or greater).

Figure 2:
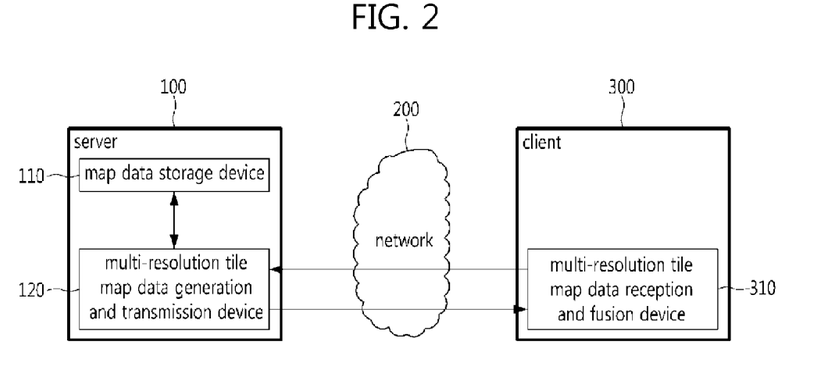
FIG. 2 is a block diagram illustrating the configuration of a system for providing a tile map service using image fusion in accordance with an exemplary embodiment of the present invention.

Exemplary Configuration of System for Providing Tile Map Service According to the Present Invention FIG. 2 is a block diagram illustrating the configuration of a system for providing a tile map service using image fusion in accordance with an exemplary embodiment of the present invention.

Referring to FIG. 2, a system for providing a tile map service using image fusion in accordance with an exemplary embodiment of the present invention may comprise a sending server 100, which includes a map data storage device 110 and a multi-resolution tile map data generation and transmission device 120, and a client 300 which includes a multi-resolution tile map data reception and fusion device 310.

The map data storage device 110 of the server 100 stores original tile map data, i.e., high-resolution color tile map data, grayscale image tile map data having a resolution (with a width of W and a height of H), which is equal to or lower than that of the original tile map data, and generated from the original tile map data, and a plurality of multi-resolution color image tile map data having a resolution lower than that of the grayscale image tile map data.

The multi-resolution tile map data generation and transmission device 120 of the server 100 reads the original tile map data from the map data storage device 110, generates the grayscale image tile map data and the multi-resolution color image tile map data, and stores the generated data in the map data storage device 110. The multi-resolution tile map data generation and transmission device 120 adaptively selects color image tile map data having an appropriate resolution from the plurality of multi-resolution color image map data in response to a request from the client 300 that has identified the variable environment of the network 200 and transmits the selected data. For example, as described with reference to FIG. 1, the multi-resolution tile map data generation and transmission device 120 receives the value of N fed back from the client 300 among the plurality of color image tile map data having a resolution with a width of $W/2^N$ and a height of $H/2^N$ and transmits color image tile map data having a resolution selected based on the value of N.

Moreover, the network 200 includes various types of wired and wireless networks, through which the tile map data can be exchanged between the server 100 and the client 300. For example, when the client 300 is a smart phone, a mobile communication terminal, etc., the network 200 may be a wireless mobile communication network such as CDMA, WCDMA, LTE, WiMax, etc. and, when the client 300 is a stationary computer, the network 200 may be a wired Internet network.

Meanwhile, the client 300 is provided with the multi-resolution tile map data reception and fusion device 310 which fuses the grayscale image tile map data and the color image tile map data, which are received through the network 200, and provides color tile map data having the resolution of the grayscale image tile map data to a user.

Next, the configurations of the server 100 and the client 300 will be described in more detail with reference to FIGS. 3 and 4.

Figure 3:
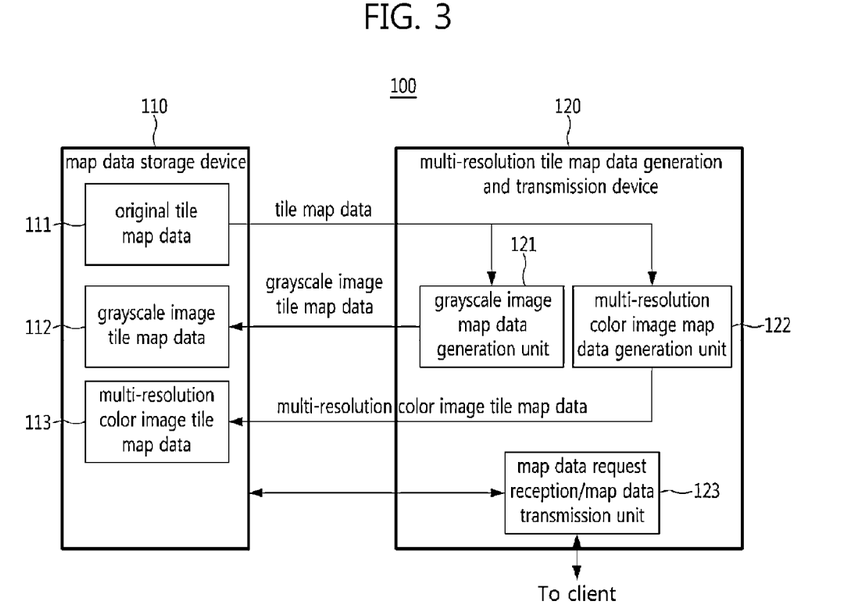
FIG. 3 is a block diagram illustrating the configuration of a sending server in a system for providing a tile map service using image fusion in accordance with an exemplary embodiment of the present invention.

Exemplary Configuration of Server in System for Providing Tile Map Service According to the Present Invention FIG. 3 is a block diagram illustrating the configuration of a sending server in a system for providing a tile map service using image fusion in accordance with an exemplary embodiment of the present invention.

Referring to FIG. 3, the server 100 of the tile map serve system in accordance with an exemplary embodiment of the present invention may comprise a map data storage device 110 and a multi-resolution tile map data generation and transmission device 120.

The map data storage device 110 is a file system or database for storing original tile map data 111, grayscale image tile map data 112 generated from the original tile map data 111, and multi-resolution color image tile map data 113.

The multi-resolution tile map data generation and transmission device 120 may comprise a grayscale image map data generation unit 121, a multi-resolution color image map data generation unit 122, and a map data request reception/map data transmission unit 123.

The grayscale image map data generation unit 121 reads the original tile map data from the map data storage device 110, generates the grayscale image tile map data 112 by converting the original tile map data into a grayscale image, and stores the generated data in the map data storage device 110.

Next, the multi-resolution color image map data generation unit 122 reads the original tile map data 111, generates the multi-resolution color image tile map data 113 including a plurality of color image tile map data having a resolution lower than that of the grayscale image tile map data, and stores the generated data in the map data storage device 110.

Lastly, the map data request reception/map data transmission unit 123 corresponds to a map data request transmission/map data reception unit 311 in a multi-resolution tile map data reception and fusion device 310 of the client 300, which will be described with reference to FIG. 4 later. The map data request reception/map data transmission unit 123 receives a request based on the network environment from the client 300 and transmits grayscale image tile map data generated and color image tile map data having a selected resolution.

Figure 4:
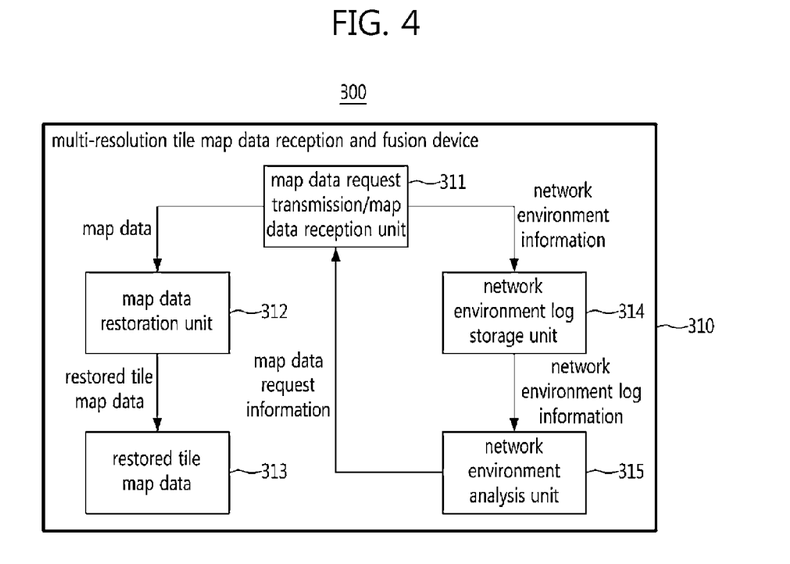
FIG. 4 is a block diagram illustrating the configuration of a receiving client in a system for providing a tile map service using image fusion in accordance with an exemplary embodiment of the present invention.

Exemplary Configuration of Client in System for Providing Tile Map Service According to the Present Invention FIG. 4 is a block diagram illustrating the configuration of a receiving client in a system for providing a tile map service using image fusion in accordance with an exemplary embodiment of the present invention.

Referring to FIG. 4, the client 300 of the tile map serve system in accordance with an exemplary embodiment of the present invention may comprise a multi-resolution tile map data reception and fusion device 310.

In detail, the multi-resolution tile map data reception and fusion device 310 may comprise a map data request transmission/map data reception unit 311, a network environment log storage unit 314, a network environment analysis unit 315, and a map data restoration unit 312.

First, the map data request transmission/map data reception unit 311 corresponds to the map data request reception/map data transmission unit 123 in the multi-resolution tile map data generation and transmission device 120 of the server 100, which has been described with reference to FIG. 3.

The map data request transmission/map data reception unit 311 requests tile map data from the map data request reception/map data transmission unit 123 through the network in response to a request from a user and transmits a control value (e.g., a value of N), which will be used to adaptively select the resolution of the multi-resolution color image tile map data that the server has to transmit based on the network environment, to the server. Moreover, the map data request transmission/map data reception unit 311 continuously receives the grayscale image tile map data and the color image tile map data from the map data request reception/map data transmission unit 123 of the server.

Next, the network environment log storage unit 314 and the network environment analysis unit 315 measure the variable network environment (such as transmission rate).

That is, the network environment log storage unit 314 stores logs for request/reception time, transmission error rate, etc, of packets exchanged through the network. The network environment log storage unit 314 may be configured to receive the above-described network environment information from the map data request transmission/map data reception unit 311 and store the received information.

The network environment analysis unit 315 analyzes the network environment based on network environment log data stored in the network environment log storage unit 314 to determine the control value (e.g., a value of N) related to the resolution of the color image tile map data, which will be requested from the server, converts the determined control value into map data request information, and transmits the generated map data request information to the map data request transmission/map data reception unit 311. Then, the information to the map data request transmission/map data reception unit 311 transmits the generated map data request information to the server.

Lastly, the map data restoration unit 312 fuses the grayscale image tile map data and the color image tile map data, which are received by the map data request transmission/map data reception unit 311, to generate color tile map data having the original resolution, and provides the restored tile map data 313 to the user.

Method for Providing Tile Map Service According to the Present Invention

Figure 5:
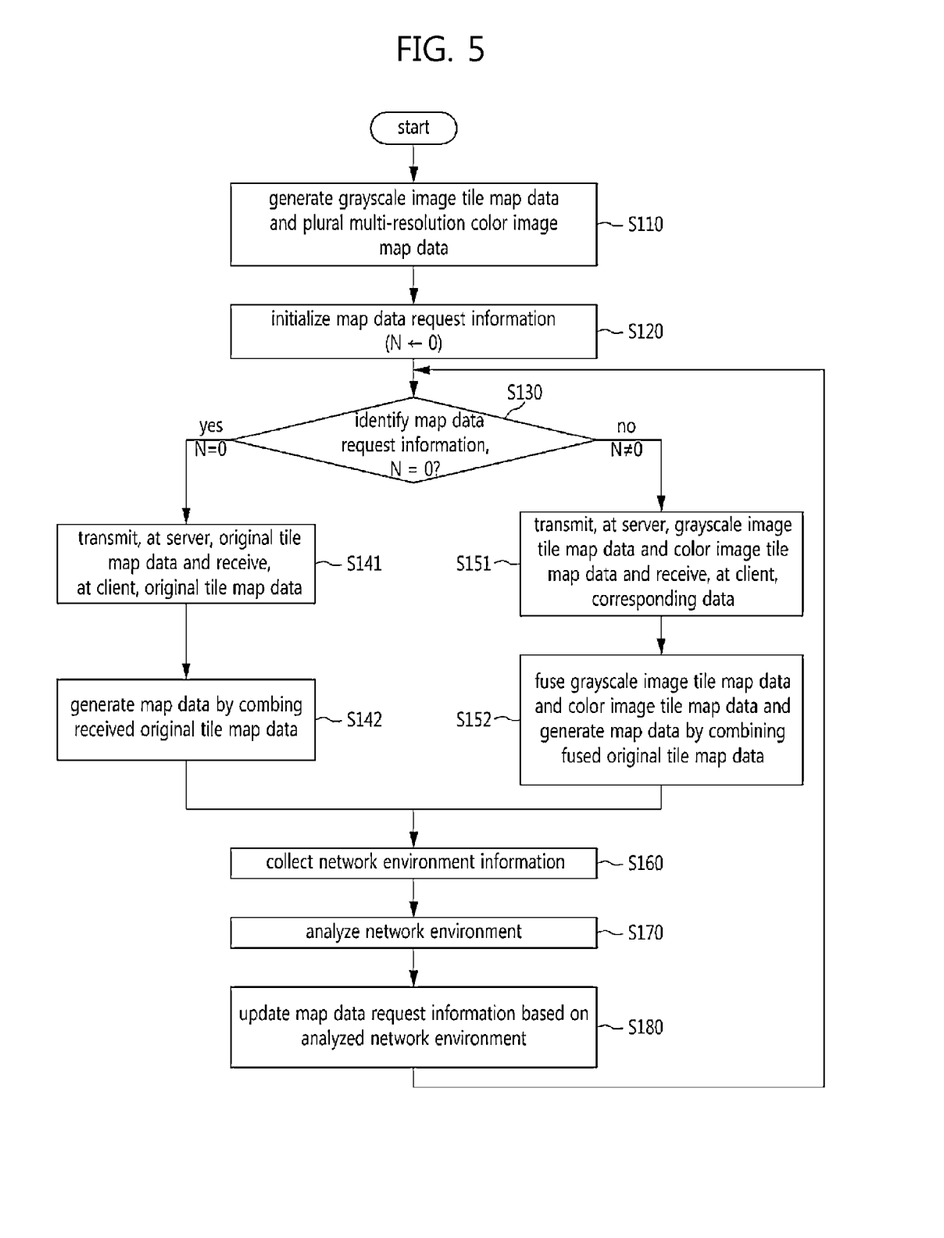
FIG. 5 is a flowchart illustrating a method for providing a tile map service using image fusion in accordance with another exemplary embodiment of the present invention.

FIG. 5 is a flowchart illustrating a method for providing a tile map service using image fusion in accordance with another exemplary embodiment of the present invention.

Referring to FIG. 5, a method for providing a tile map service in accordance with another exemplary embodiment of the present invention may comprise a step (S110) of generating grayscale image tile map data and a plurality of multi-resolution color image map data, a step (S120) of initializing map data request information, and a step (S130) of identifying the map data request information.

In step S130, as a result of identifying the map data request information, if it is determined that the image fusion is not used, step S130 may further comprise a step (S141), in which the server transmits original tile map data and the client receives the original tile map data, and a step (S142) of generating map data by combing the received original tile map data. Moreover, in step S130, as a result of identifying the map data request information, if it is determined that the image fusion is used, the step S130 may further comprise a step (S151), in which the server selects color image tile map data having a resolution determined based on the map data request information from the grayscale image tile map data and the plurality of multi-resolution color image map data and transmits the selected color image tile map data and the client receives the color image tile map data, and a step (S152) of fusing the received grayscale image tile map data and color image tile map data and generating map data by combining the fused original tile map data.

Moreover, the method for providing a tile map service in accordance with another exemplary embodiment of the present invention may further comprise a step (S160) of collecting and storing network environment information, a step (S170) of analyzing the network environment based on the collected network environment information, and a step (S180) of updating the map data request information based on the analyzed network environment. After step S180, the processes after step S130 may be repeated.

Next, the above steps will be described in detail.

First, in step S110, grayscale image tile map data 112 and a plurality of multi-resolution color image map data are generated using the original tile map data 111 stored in the map data storage device 110, and the generated data is stored in the map data storage device 110. Here, the resolution of the grayscale image tile map data may be defined as a width of W and a height of H. The resolution of the grayscale image tile map data may be the same as or different from that of the original tile map data. Moreover, the plurality of multi-resolution color image map data may have a resolution lower than that of the grayscale image tile map data.

For example, when the grayscale image tile map data has a resolution with a width of W and a height of H, the plurality of multi-resolution color image map data may have a resolution with a width of $W/M^N$ and a height of $H/M^N$ (where each of M and N is an integer of 1 or greater). That is, in step S110, the plurality of multi-resolution color image map data having a resolution corresponding to the value of N (N=1, 2 . . . ) may be generated and stored in the map data storage device 110.

Meanwhile, although it has been described that the color image tile map data has a resolution with a width of $W/2^N$ and a height of $H/2^N$ with respect to the grayscale image tile map data having a resolution with a width of W and a height of H in FIG. 1, the resolution of the color image tile map data may be set to a width of W/N and a height of H/N, a width of $W/3^N$ and a height of $H/3^N$, etc. That is, while the values of $W/2^N$ and $H/2^N$ can be selected to improve the efficiency of image restoration, the resolution of the color image tile map data may be controlled in another manner to provide more precise variable transmission control.

Referring to FIG. 5 in combination with FIG. 3, step S110 is performed by the grayscale image map data generation unit 121 and the multi-resolution color image map data generation unit 122, which constitute the multi-resolution tile map data generation and transmission device 120 of the server 100.

Next, in step S120, an initial value of the map data request information (including the value of N, for example) is determined. The map data request information is a value obtained by the network environment analysis unit 315 shown in the configuration of the client of FIG. 4, which analyzes the current network status based on the network environment information stored in the network environment log storage unit 314, and transmitted to the server. That is, the map data request information is a value transmitted to the map data request reception/map data transmission unit 123 of the server through map data request transmission/map data reception unit 311 of the client 300. At the start of the service, it is difficult to determine the network status, and thus it is preferred that the value of N is set to 0. This means that the original tile map data is transmitted instead of the divided grayscale image tile map data and color image tile map data (using the image fusion). However, it is not necessary to set the initial value to 0, and the initial value of N may be set to 1 or greater in a poor network environment.

In step S130, the map data request reception/map data transmission unit 123 determines whether the map data request information N transmitted from the map data request transmission/map data reception unit 311 is 0.

Here, if the map data request information N is 0, step S130 is divided into step S141 and step S142 and, if the map data request information N is 1 or greater, step S130 is divided into step S151 and step S152.

The case where the map data request information N is 1 or greater corresponds to the tile map transmission using the image fusion, in which grayscale image tile map data and color image tile map data having a low resolution are separated and transmitted due to the poor network environment.

Step S141 is performed when the map data request information N is 0, in which the map data request reception/map data transmission unit 123 of the server 100 transmits the original tile map data stored in the map data storage device 110 to the map data request transmission/map data reception unit 311 of the client 300. Next, in step 142, the map data request transmission/map data reception unit 311 transmits the received original tile map data to the map data restoration unit 312, and the map data restoration unit 312 restores the received original tile map data to a full map and provides the full map to the user or stores the full map.

Step S151 is performed when the map data request information N is 1 or greater, in which the map data request reception/map data transmission unit 123 of the server 100 transmits the grayscale image tile map data and color image tile map data having a resolution lower than that of the grayscale image tile map data stored in the map data storage device 110 to the map data request transmission/map data reception unit 311 of the client 300.

For example, when the grayscale image tile map data has a resolution with a width of W and a height of H, the plurality of multi-resolution color image map data may have a resolution with a width of $W/M^N$ and a height of $H/M^N$ (where each of M and N is an integer of 1 or greater). That is, the multi-resolution color image map data generation unit 122 may generate a plurality of multi-resolution color image map data having a resolution corresponding to the value of N (N=1, 2 . . . ) and store the generated data in the map data storage device 110.

Here, the transmitted color image tile map data having a resolution with a width of $W/2^N$ and a height of $H/2^N$ (where N is 1 or greater) is selected from the plurality of multi-resolution color image map data having a resolution with a width of $W/2^N$ and a height of $H/2^N$ based on the value of N included in the map data request information when the grayscale image tile map data has a resolution with a width of W and a height of H.

Meanwhile, although it has been described that the plurality of multi-resolution color image map data is composed of the color image tile map data having a resolution with a width of $W/2^N$ and a height of $H/2^N$ with respect to the grayscale image tile map data having a resolution with a width of W and a height of H, the resolution of each of the plurality of color image tile map data may be set to a width of W/N and a height of H/N, a width of $W/3^N$ and a height of $H/3^N$, etc. That is, while the values of $W/2^N$ and $H/2^N$ can be selected to improve the efficiency of image restoration, the resolution of the color image tile map data may be controlled in another manner to provide more precise variable transmission control.

Next, in step S152, the map data request transmission/map data reception unit 311 of the client 300 transmits the received grayscale image tile map data and color image tile map data to the map data restoration unit 312, and the map data restoration unit 312 restores the received grayscale image tile map data and color image tile map data to color tile map data having the resolution (with a width of W and a height of H) of the grayscale image tile map data through the image fusion. The map data restoration unit 312 generates a full map by combining the color tile map data restored through the image fusion and provides the full map to the user or stores the full map.

In step S160, the map data request transmission/map data reception unit 311 transmits the network environment information to the network environment log storage unit 314 such that the network environment log storage unit 314 can log network-related indicators used to identify the network environment.

In step S170, the network environment log storage unit 314 transmits the network environment information to the network environment analysis unit 315, and the network environment analysis unit 315 analyzes the received network environment information. In step S180, the network environment analysis unit 315 generates map data request information (including the value of N, for example) based on the network environment information such as data request/reception time, etc. and transmits the map data request information to the map data request transmission/map data reception unit 311. Here, the map data request transmission/map data reception unit 311 transmits the map data request information to the map data request reception/map data transmission unit 123 of the server 100.

Thereafter, the process is returned to step S130, and the processes after step S130 may be repeated based on the updated map data request information.

As described above, according to the method and system for providing the tile map service of the present invention, during a spatial information service, the grayscale image tile map data and the color image tile map data having an optimal spatial resolution are transmitted, and the transmitted grayscale image tile map data and color image tile map data are restored to color image tile map data having a high spatial resolution according to the variable network environment. As a result, when data is transmitted through the network, it is possible to transmit the data adaptively to different network environments and to ensure an optimal spatial resolution through image fusion, thereby providing an effective spatial information service.

While the invention has been particularly shown and described with reference to exemplary embodiments thereof, it will be understood by those of ordinary skill in the art that various changes in form and details may be made therein without departing from the spirit and scope of the invention as defined by the following claims.

What is claimed is:

1. A system for providing a tile map service using image fusion, the system comprising a server and a client which receives a tile map service from the server through a network,
    wherein the server comprises a map data storage device, which stores original tile map data, grayscale image tile map data generated from the original tile map data, and a plurality of multi-resolution color image tile map data having a resolution lower than that of the grayscale image tile map data, and a multi-resolution tile map data generation and transmission device, which reads the original tile map data from the map data storage device, generates the grayscale image tile map data and the multi-resolution color image tile map data, and stores the generated data in the map data storage device, the server transmitting the grayscale image tile map data and color image tile map data having a resolution selected from the plurality of multi-resolution color image map data,
    wherein the client comprises a multi-resolution tile map data reception and fusion device which generates color tile map data having the resolution of the grayscale image tile map data by fusing the grayscale image tile map data and the color image tile map data, which are received through the network, and provides the color tile map data to a user, and
    wherein the resolution of the color image tile map data transmitted from the server is variably controlled by the client according to the network environment.

2. The system of claim 1, wherein the plurality of multi-resolution color image map data comprises a plurality of color image tile map data, and the resolution of each of the plurality of color image map data is defined as a width of $W/M^N$ and a height of $H/M^N$ (where each of M and N is an integer of 1 or greater) when the grayscale image tile map data has a resolution with a width of W and a height of H.

3. The system of claim 2, wherein the color image tile map data transmitted from the server is selected from the plurality of multi-resolution color image map data having a resolution with a width of $W/M^N$ and a height of $H/M^N$ corresponding to the value of N based on the value of N (N is an integer of 1 or greater) included in map data request information and transmitted by the client.

4. A server for providing a tile map service through a network, the server comprising:
    a map data storage device which stores original tile map data, grayscale image tile map data generated from the original tile map data, and a plurality of multi-resolution color image tile map data; and
    a multi-resolution tile map data generation and transmission device,
    wherein the multi-resolution tile map data generation and transmission device comprises:
        a grayscale image map data generation unit which reads the original tile map data from the map data storage device, generates grayscale image tile map data, and stores the grayscale image tile map data in the map data storage device;
        a multi-resolution color image map data generation unit which reads the original tile map data from the map data storage device, generates a plurality of multi-resolution color image tile map data having a resolution lower than that of the grayscale image tile map data, and stores the generated data in the map data storage device; and
        a map data request reception/map data transmission unit which reads color image tile map data having a resolution, selected from the plurality of multi-resolution color image tile map data stored in the map data storage device, and the grayscale image tile map data in response to map data request information received from a client and transmits the read data to the client.

5. The server of claim 4, wherein the plurality of multi-resolution color image tile map data comprise a plurality of color image tile map data, and the resolution of each of the plurality of color image map data is defined as a width of $W/M^N$ and a height of $H/M^N$ (where each of M and N is an integer of 1 or greater) when the grayscale image tile map data has a resolution with a width of W and a height of H.

6. The server of claim 5, wherein the map data request information received from the client comprises the value of N, and the map data request reception/map data transmission unit selects color image tile map data having a resolution with a width of $W/M^N$ and a height of $H/M^N$ corresponding to the value of N from the plurality of multi-resolution color image map data stored in the map data storage device and transmits the selected data.

7. A client for receiving a tile map service through a network, the client comprising:
    a map data request transmission/map data reception unit which transmits map data request information for requesting tile map data to a server through the network and receives grayscale image tile map data, which corresponds to the map data request information, and color image tile map data having a resolution lower than that of the grayscale image tile map data, the map data request information including a value used to designate the resolution of the color image tile map data;
    a map data restoration unit which receives the grayscale image tile map data and the color image tile map data from the map data request transmission/map data reception unit and generates color tile map data having the resolution of the grayscale image tile map data;
    a network environment log storage unit which logs a usage history of the network; and
    a network environment analysis unit which analyzes the network environment based on the network usage history logged in the network environment log storage unit to determine a value, which is used to designate the resolution of the color image tile map data and included in the map data request information, and transmits the determined value to the map data request transmission/map data reception unit.

8. The client of claim 7, wherein the resolution of the color image map data is defined as a width of $W/M^N$ and a height of $H/M^N$ (where each of M and N is an integer of 1 or greater) when the grayscale image tile map data has a resolution with a width of W and a height of H.

9. The client of claim 8, wherein the value used to designate the resolution of the color image tile map data and included in the map data request information comprises the value of N.

10. A method for providing a tile map service through a network, the method comprising:

generating, at a server processor, grayscale image tile map data and a plurality of multi-resolution color image tile map data from original tile map data;

initializing, at a client processor, map data request information;

identifying, at the server processor, the map data request information;

transmitting, at the server processor, the original tile map data and receiving, at the client processor, the original tile map data and generating map data by combining the received original tile map data, when it is determined from the map data request information that image fusion is not used;

selecting, at the server processor, color image tile map data having a resolution determined based on the map data request information from the grayscale image tile map data and the plurality of multi-resolution color image tile map data, and transmitting the selected data, and receiving, at the client processor, the transmitted data and generating map data by fusing the received grayscale image tile map data and color image tile map data and combining the fused tile map data, when it is determined from the map data request information that the image fusion is used;

collecting and storing, at the server processor, network environment information;

analyzing, at the server processor, the network environment based on the collected network environment information; and     updating, at the server processor, the map data request information based on the analyzed network environment,     wherein after the updating of the map data request information, the identifying of the map data request information is repeated based on the updated map data request information.

11. The method of claim 10, wherein the multi-resolution color image tile map data comprises color image tile map data having a resolution with a width of $W/M^N$ and a height of $H/M^N$ (where each of M and N is an integer of 1 or greater) when the grayscale image tile map data has a resolution with a width of W and a height of H.

12. The method of claim 11, wherein the map data request information comprises the value of N.

\* \* \* \* \*